United States Patent [19]

Lück

[11] Patent Number: 5,454,519

[45] Date of Patent: Oct. 3, 1995

[54] METHOD FOR DISAGGREGATING CLOSED GLASS MEMBERS CONTAINING POLLUTANTS INTO RECYCLABLE CONSTITUENTS

[75] Inventor: Harald Lück, Judenberweg 20, A 5020 Salzburg, Austria

[73] Assignee: Harald Lück, Salzburg, Austria

[21] Appl. No.: 232,120

[22] PCT Filed: Aug. 30, 1993

[86] PCT No.: PCT/DE93/00788

§ 371 Date: May 2, 1994

§ 102(e) Date: May 2, 1994

[87] PCT Pub. No.: WO94/05428

PCT Pub. Date: Mar. 17, 1994

[30] Foreign Application Priority Data

Sep. 1, 1992 [DE] Germany .............. 42 29 124.0

[51] Int. Cl.$^6$ .............. B02C 19/12; B02C 23/08
[52] U.S. Cl. .............. 241/24; 241/29; 241/DIG. 38
[58] Field of Search .............. 241/24, 29, DIG. 38, 241/79.1

[56] References Cited

U.S. PATENT DOCUMENTS

| | | | |
|---|---|---|---|
| 3,650,396 | 3/1972 | Gillespie et al. | 209/3 |
| 5,106,598 | 4/1992 | Cogar | 423/99 |
| 5,236,134 | 8/1993 | Krawczyk et al. | 241/21 |
| 5,246,174 | 9/1993 | Vitunac et al. | 241/94 |
| 5,314,071 | 5/1994 | Christian et al. | 209/4 |
| 5,333,797 | 8/1994 | Becker et al. | 241/19 |
| 5,350,121 | 9/1994 | Vitunac et al. | 241/14 |
| 5,360,169 | 11/1994 | Kohler | 241/24 |

FOREIGN PATENT DOCUMENTS

| | | |
|---|---|---|
| 0420367 | 4/1991 | European Pat. Off. . |
| 4030732 | 12/1991 | Germany . |
| 4130531 | 3/1992 | Germany . |

OTHER PUBLICATIONS

Aufbereintungs Technik, Aug. 1992, pp. 460–462, W. Thommel, Altglas–Recycling.

Primary Examiner—Irene Cuda
Assistant Examiner—John M. Husar
Attorney, Agent, or Firm—Hill, Steadman & Simpson

[57] ABSTRACT

Method for disaggregating closed glass members containing pollutants, such as picture tubes or gas discharge tubes, into recyclable constituents, whereby the glass members are separated according to glass types, such as front and cone glass of picture tubes and glass of gas discharge tubes, and into other constituents, particularly metallic and ceramic constituents, and the materials that represent pollutants for the purpose of a recycling are disposed of, whereby complete glass members are disaggregated into palm-sized pieces, in that, subsequently, at least that part of the pollutants released and/or disassociated upon disaggregation of the glass members is separated from the glass fragments and from the remaining parts, and in that the steps of separating magnetic metals, of separating non-magnetic metals, of sorting opaque materials such as ceramic, pottery, stone and/or porcelain parts out, and of separating the various glass types are implemented in corresponding separating means.

18 Claims, 2 Drawing Sheets

METHOD FOR DISAGGREGATING CLOSED GLASS MEMBERS CONTAINING POLLUTANTS INTO RECYCLABLE CONSTITUENTS

BACKGROUND OF THE INVENTION

The invention is directed to a method for disaggregating closed glass members containing pollutants, such as picture tubes or gas discharge tubes, into recyclable constituents, whereby the glass members are separated according to glass types, such as front and cone glass of picture tubes and glass of gas discharge tubes, and into other component parts, particularly metallic and ceramic component parts, and the materials representing pollutants for the purpose of recycling are disposed of.

Recycling has become an important topic at the current time. Both the limited nature of raw materials as well as the environmental pollution make it necessary to think about the recyclability of the waste produced by industry.

One is confronted nearly daily with the recycling of paper and glass. In many locations, it is a matter of course to have different garbage cans for paper, glass and other household waste. The success of this separate waste management is reflected, for example, therein that every second hollow glass vessel is already currently made of recycled glass.

Recycling systems place high demands on the quality profile of the materials to be reprocessed. A main problem is thereby resolving the waste into various constituents, i.e. to separate the waste into its different, recyclable component parts. This principle of division into various component parts is successfully employed, for example, when separating aluminum cans from household waste or when separating bottle closures from glass bottles. The situation, however, becomes more complicated given electronic wastes such as, for example, television sets, computer monitors, computer terminals and picture screen devices in general. Various types of glass, types of metal, plastics and pollutants must thereby be separated from one another. The various component parts can thereby be manually separated with high personnel costs or the entire electronics waste can simply be comminuted, whereupon the component parts, however, can no longer be employed and thus become a part of the disposed waste.

Management of waste, whether in the form of dumping or recycling, is thereby subject to the laws governing waste. Particularly in the case of polluting waste, the demands made of the disposal systems by the laws governing waste are rather strict. However, no satisfactory disposal systems for closed glass members containing pollutants, namely members mainly composed of glass but also comprising pollutants, metals and ceramic that, according to the catalog of wastes requiring special monitoring, are subsumed under one waste category and comprise picture tubes, gas discharge tubes and the like, have hitherto become known.

If, for example, one wishes to recycle the component parts of a picture tube, then the various component parts thereof that are composed of pollutant-loaded front glass, lead-containing cone glass, a metal band for integration into a housing, a metal mask as well as metal knobs for arresting the masks for color picture tubes must be separated from one another. As a consequence of the complicated nature or, respectively, of the great plurality of different materials, this separation frequently occurs manually. The glued metal band is removed first; the cone and front glass can then be cut with a diamond disk and can be separated from the picture tube under the influence of heat; next, the mask and, subsequently, the locking knobs are manually or automatically removed; the cone glass is then not farther-processed and can be eliminated; and, finally, the pollutants are removed from the insides of the front glass. The component parts separated in this way can then be in turn returned into the economical cycle.

For example, DE 39 01 842 A1 discloses a method for the separation of picture tube glass of picture tubes and the cleaning thereof, The metal band—after it has been undone—, the mask as the well as the arresting knobs are thereby magnetically separated and the cone glass is separated from the front glass with a cutting disk such as a diamond disk. Subsequently, the phosphor layer on the front glass and the coating of the cone glass are stripped off, for example with sand or water under high pressure.

In the case of gas discharge tubes that utilize the radiation of discharge plasmas, potentially in cooperation with phosphors, it is standard to employ a disaggregation method that is essentially the same as that for picture tubes. The ends comprising the metal and ceramic constituents of a gas discharge tube are thereby separated from the corresponding glass tube with the assistance of a diamond disk, whereby the gas necessary for the discharge plasma is either pumped off or is released into the atmosphere or, in the case of a mercury vapor lamp, mercury is neutralized by spreading a Hg-binding substance such as Merkurisorb® on and can then be shaken out of the glass tube into a collecting vessel. When a phosphor layer is applied on the inside of the glass tube, this is stripped off with sand or water under high pressure, so that the various component parts of a gas discharge tube can then in turn be returned into the economic cycle.

A mechanical comminution of picture tubes and/or gas discharge tubes has hitherto always produced a "mash" composed of the various component parts thereof, and this "mask" is not recyclable. Such an undifferentiated production of a mash is unsatisfactory, particularly in view of pollutant disposal.

SUMMARY OF THE INVENTION

The invention is therefore based on the object of creating a method for disaggregating closed glass members such as picture tubes or gas discharge tubes that contain pollutants into recyclable constituents that can be realized both fully automatically as well as continuously and with little expense for personnel, whereby economic feasibility as well as a low energy consumption should be assured. In order to meet the high demands made of recycling systems, the method of the invention should also assure a high separating efficiency.

For achieving this object, the method of the invention is characterized in that complete glass members are disaggregated into palm-sized pieces, in that, subsequently, at least the part of the pollutants released and/or dissociated upon dissociation of the glass members is separated from the broken glass and from the remaining parts; and in that the steps of separating magnetic metals, of separating non-magnetic metals, of sorting out opaque substances such as ceramic, pottery, stone and/or porcelain parts, and of separating the various types of glass are implemented in appropriate separation devices.

It is thereby provided that the comminution of the glass members occurs in a comminution means essentially without loss of the surface properties of the respective component parts, and that, subsequently, essentially all pollutants are removed from the glass member fragments in a pollutant separating means.

It is also proposed that the pollutant separating means comprises a pollutant separating chamber in which pollutant coats are stripped by rubbing the comminuted parts of the glass members against one another, and that the part of the pollutant coatings disaggregated upon disaggregation and/or rubbing is conducted via a conduit to a first filter system having a connecting, first collecting vessel.

It is thereby also provided that the disaggregated pollutants be conducted to the first filter system with a suction or under-pressure from the comminution means and/or from the pollutant separating chamber.

The invention also proposes that the removal of the disaggregated pollutants from the remaining component parts be promoted upon utilization of the different specific weights of the pollutants as well as of the other constituents by employing a first centrifuge.

The invention is also provides that the disaggregation of pollutant coats from the broken glass comprises the employment of an auxiliary substance that, after the stripping of the pollutants, conducts the disaggregated pollutants via a conduit to the first filter system, that the auxiliary substance is freed of the pollutants in the first filter system, and that the cleaned auxiliary substance is returned into the pollutant separating chamber, whereas the pollutants remain in the first collecting vessel.

It is thereby inventively provided that an auxiliary substance that is inert with respect to the pollutant coats such as a non-fluid solid substance like viscose staple fiber, sand or the like, an inert fluid such as water or an inert gas such as air is employed as the auxiliary substance.

The invention thereby also provides that at least a first nozzle is installed in the pollutant separating chamber, this first nozzle effecting a spraying of the auxiliary substance onto the comminuted glass member constituents and/or effecting the creation of auxiliary substance eddies for promoting the separating process.

It is also proposed that the comminuted glass member constituents be in turn conveyed out of the auxiliary substance after being freed of the pollutant coats due to the contact with the auxiliary substance.

The invention likewise provides that the auxiliary substance carrying the disaggregated pollutant coats be separated from the remaining fragment constituents in a second centrifuge as a result of the different specific weight thereof in comparison to the remaining fragment constituents.

It is also inventively provided that the auxiliary substance together with the disaggregated pollutant coats be conducted to the first filter system with a suction or under-pressure.

It is also provided that gases that are released upon disaggregation of the glass members are pumped out from the comminution means and are supplied to a second collecting vessel.

It is also inventively provided that the pollutant separating means comprises a thermal section in which liquid mercury originally present in the glass members is evaporated, and that mercury vapor be pumped out of the comminution means and/or of the pollutant separating means and be supplied to a third collecting vessel via a mercury condenser.

As an alternative, the invention also proposes that the comminution means be cooled such that when disaggregating mercury-containing glass members essentially no mercury vapor is released.

It is thereby inventively provided that the pollutant separating means comprises a mercury separating chamber wherein mercury is neutralized with the assistance of a Hg-bonding additive on the basis of salt formation, complex formation and/or absorption and be conducted to a second filter system, that the additive be freed of the mercury in the second filter system, and that the cleaned additive be returned to the mercury separating chamber, whereas the mercury is conducted to a third collecting vessel.

It is thereby proposed that the additive is sprayed onto the fragments of the glass members with at least one second nozzle.

The invention also proposes that the comminuted glass member constituents be conducted through the additive.

It is provided as an alternative that the additive together with the mercury is separated from the remaining fragments of the glass members with a second centrifuge on the basis of its specific weight.

It is also inventively provided that a separator for magnetic metals, a glass separator for front glass of picture tubes and/or glass of gas discharge tubes, a separator for non-magnetic metals and/or a separator for opaque substances is employed and is respectively equipped with at least one transmission and reception unit for infrared light that utilizes the absorption, transmission and/or reflection power of the different glass member constituents freed of pollutants for the selecting.

It is likewise provided that the separator for magnetic metals comprises at least one magnet.

The invention further proposes that the separator for magnetic metals and/or the separator for non-magnetic metals utilizes the different electrostatic charging of the comminuted glass member constituents.

It is also inventively provided that the separator for magnetic metals and/or the separator for non-magnetic metals comprises at least one metal sensor.

It is also provided that at least one ceramic sensor is utilized in the opaque material separator.

The invention also proposes that conveyor belts that enable conveying between the various separating means are equipped with vibrators.

It is also inventively provided that the subfractional parts that have arisen during the comminution of the glass members are screened out of the remaining fragments and are respectively conducted to at least one fourth collecting vessel with the assistance of a funnel or the like.

It is thereby proposed that the screening occurs in at least one drum to be traversed and on the basis of outside wall bores thereof.

The invention also provides that the screening of subfractional parts occurs during the conveying between at least two different separating devices with holes present in the corresponding, vibrating, conveying conveyor belt.

An exemplary embodiment of the invention is characterized in that picture tubes are first comminuted, are then freed of pollutants and are subsequently freed of sub-fractional parts, and in that the magnetic metals are then sorted out, the front glass is subsequently removed from the fragments, the non-magnetic metals are subsequently separated, and the opaque substances are separated from the cone glass in the last step.

Another exemplary embodiment of the invention is characterized in that gas discharge tubes are first comminuted, are then freed of pollutants and are subsequently freed of sub-fractional parts, and in that the magnetic metals are then sorted out, the glass is removed thereafter and, subsequently, the non-metallic metals are separated from the opaque substances.

It is further provided that the comminution means is formed by a first comminutor for picture tubes and/or a second comminutor for gas discharge tubes.

It is thereby inventively provided that the first comminutor is connected to the pollutant separating chamber.

It is thereby further provided that the second comminutor is connected to the thermal section or to the mercury separating chamber.

It is preferred that, after the separation of the pollutants, the remaining picture tube constituents and the remaining gas discharge tube constituents are further-processed together, whereby the glass of the gas discharge tubes is separated together with the front glass of the picture tubes.

Alternatively, it is provided that, following the comminution of the gas discharge tubes as well as the removal of the mercury contained therein and after the comminution of the picture tubes, the remaining picture tube constituents and the remaining gas discharge tube constituents are further-processed together, whereby the glass of the gas discharge tubes is separated together with the front glass of the picture tubes.

As an alternative, the invention also proposes that the first comminutor and the second comminutor are fashioned as one, that the pollutant separating chamber is fashioned as one with the thermal section or with the mercury separating chamber, and the picture tubes together with the gas discharge tubes are disassociated into recyclable constituents, whereby the glass of the gas discharge tubes is separated together with the front glass of the picture tubes.

A further feature of the invention is that the first comminutor and/or the second comminutor comprises a shredder.

The invention also proposes that the comminution means is fashioned as one with the pollutant separating means.

The invention is based on the surprising perception that closed glass members containing pollutants can be disassociated into their various, recyclable constituents in that, following a comminution and a separation of pollutants, whether in the form of a mechanical abrasion of phosphor layers and/or by baking or bonding the mercury serving the purpose of gas discharge, they pass through various separating means wherein the different glass types, magnetic and non-magnetic metals as well as opaque substances are successively separated.

Further features and advantages of the invention derive from the following description in which two exemplary embodiments of the invention are set forth in detail with reference to the schematic drawing.

DESCRIPTION OF THE PREFERRED EMBODIMENTS

Figure 1:
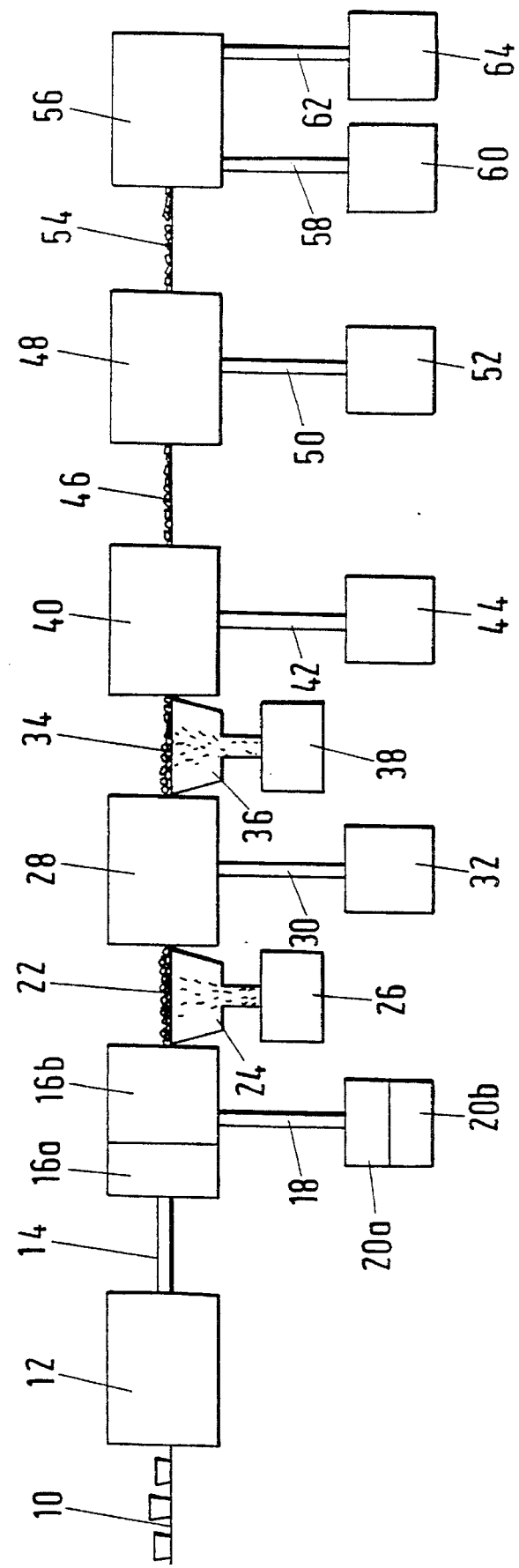
FIG. 1 a schematic illustration of a separating system of the invention for picture tubes.

Picture tubes of all types, i.e. black-and-white picture tubes as well as color picture tubes of different sizes are supplied to a separating system shown in FIG. 1 which comprises a conveyor belt 10, a shredder 12, a conveyor belt 14, an intermediate storage 16a with connecting drums 16b, a conduit 18, a filter system 20a having connected collecting vessel 20b, a conveyor belt 22, a funnel 24, a collecting vessel 26, a separator 28 for magnetic metals, a conduit 30, a collecting vessel 32, a conveyor belt 34, a funnel 36, a collecting vessel 38, a front glass separator 40, a conduit 42, a collecting vessel 44, a conveyor belt 46, a separator 48 for non-magnetic metals, a conduit 50, a collecting vessel 52, a conveyor belt 54, an opaque material separator 56, a conduit 58, a collecting vessel 60, a conduit 62 and a collecting vessel 64.

The above-described system for picture tubes assures an optimum exploitation of the separating means 28, 40, 48 and 56 on the basis of the following functioning:

Picture tubes are supplied via the vibrating conveyor belt 10 that makes the flow of material uniform, being supplied to the shredder 12 wherein a comminution of the picture tubes into palm-sized fragments occurs by breaking and splittering. After the shredding, the material is conducted to the intermediate storage 16a via a conveyor belt 14 that proceeds inside a closed connecting pipe that does not allow any pollutants to emerge. In order assure a uniform flow of material, the conveyor belt 14 is also caused to vibrate.

The broken picture tube constituents are collected in the intermediate storage 16a until an optimum filling of the drum 16b is assured. The fragments are circulated and mixed in the rotating drum 16b. During this frictional process, the pollutant coats are mechanically stripped from the broken glass. It is thereby important that the surfaces of the various picture tube constituents are not damaged to such an extent that pollutants can adhere in cracks. The shredder 12 is therefore set such that the damage to the surfaces of the constituents is kept as low as possible. The stripped pollutant dust is blown with compressed air into the inside of the drum and is supplied therefrom with under-pressure via the conduit 18 to the filter system 20a with connecting collecting vessel 20b. Due to their higher, specific dead weight the sub-fractional parts that arose during shredding are not suctioned together with the pollutants. The conveyor belt 22, which likewise vibrates, then conveys the remaining constituents to the separator 28 for magnetic metals.

On the way from the drum 16b to the separator 28, the remaining picture tube constituents are freed of a part of said sub-fractional parts in that small holes are present in the conveyor belt 22 through which subfractional parts fall, these being subsequently supplied to the collecting vessel 26 with the assistance of a funnel 24.

The magnetic metals are sorted from the remaining picture tube constituents in the separator 28 with the assistance of magnets and are then supplied via the conduit 30 to the collecting vessel 32. The remaining fragments are subsequently conveyed to the front glass separator 40 via the vibrating conveyor belt 34, which simultaneously serves the purpose of screening subfractional parts out in that said sub-fractional parts proceed through the holes contained in the conveyor belt 34 into the collecting vessel 38 via the funnel 36.

In the separator 40, the remaining fragments of the picture tubes to be disassociated proceed via a chute to a system of recognition sensors. The function of these sensors is based on the different optical properties of cone glass, front glass and opaque materials. Opaque materials absorb all of the light, whereas there are a number of possibilities in the case of the glass fragments. Cone glass contains lead, is mirrored on one side and is black on the other side. When irradiating cone glass, the transmission of the infrared light is therefore extremely slight. However, there are also fragments of the cone glass that, due to a scratched surface, have a damaged coating or no coating at all along breaks. However, the cone glass can be distinguished from the front glass with the assistance of infrared sensors, i.e. via the absorption, reflection and/or transmission of infrared light, as long as the surfaces of the glass types have not been successively damaged during comminution. This provides further boundary conditions for the comminution means 12, as a result whereof, the size of the comminuted constituents of the picture tubes is indirectly defined. Signals are forwarded to a control electronics and processed thereat given recognition of front glass by the optical recognition sensors. Via a solenoid, the electronics forwards a command to nozzles supplied with compressed air that now designationally blow the front glass into the collecting vessel 44 via the conduit 42. The remaining constituents freed of pollutants subsequently proceed via the vibrating conveyor belt 46 into the separator 48 for non-magnetic metals.

Metal detectors are installed in the separator 48, these registering the metal parts still contained in the flow of shards, i.e. the non-magnetic metal parts. The signals emitted by the metal detectors are forwarded via a control circuit to solenoids connected thereto, so that a stream of compressed air impinges a recognized metal part at the proper time, this blowing this metal part out of the stream of shards and supplying it to the collecting vessel 52 via the conduit 50. Finally, the remaining constituents proceed via the vibrating conveyor belt 54 to the opaque material separator 56.

The division into opaque substances and cone glass in the separator 56 is also based on the measurement of optical properties, i.e. on the absorption, transmission and/or reflection of infrared light. Nozzles are again driven with the assistance of the sensor system, these nozzles seeing to it that opaque materials are blown via the conduit 52 into the collecting vessel 60 and cone glass is blown via the conduit 62 into the collecting vessel 64.

The collecting vessels 20b, 26, 32, 38, 44, 52, 60 and 64 are regularly emptied and the carefully divided picture tube constituents can be supplied to a system for further-processing or, respectively, to a system for reemployment.

The breakage which has arisen in the shredder has a size (L×W×H) of 20 through 80 mm ×20 through 80 mm ×2 through 20 mm.

The pollutant part of the Zn is reduced by 76% and that of the Cd is reduced by 85% in the drum 16b, i.e. the material is practically free of pollutants.

The magnet in the separator 28 sees to it that the parts landing in the collecting vessel 32 are essentially only magnetic metals.

The front glass separator 40 works such that fewer than 6% of other constituents land in the collecting vessel 44.

A glass quantity and/or opaque material quantity of less than 1% is entrained in the separator 48 by the compressed air that blows the non-magnetic metals out.

The opaque material separator 56 has a separating efficiency of over 90%.

The throughput performance of the separating system presented with reference to FIG. 1 is more than 10 tons per hour, this illustrating the economic significance of this fully automatic method.

Figure 2:
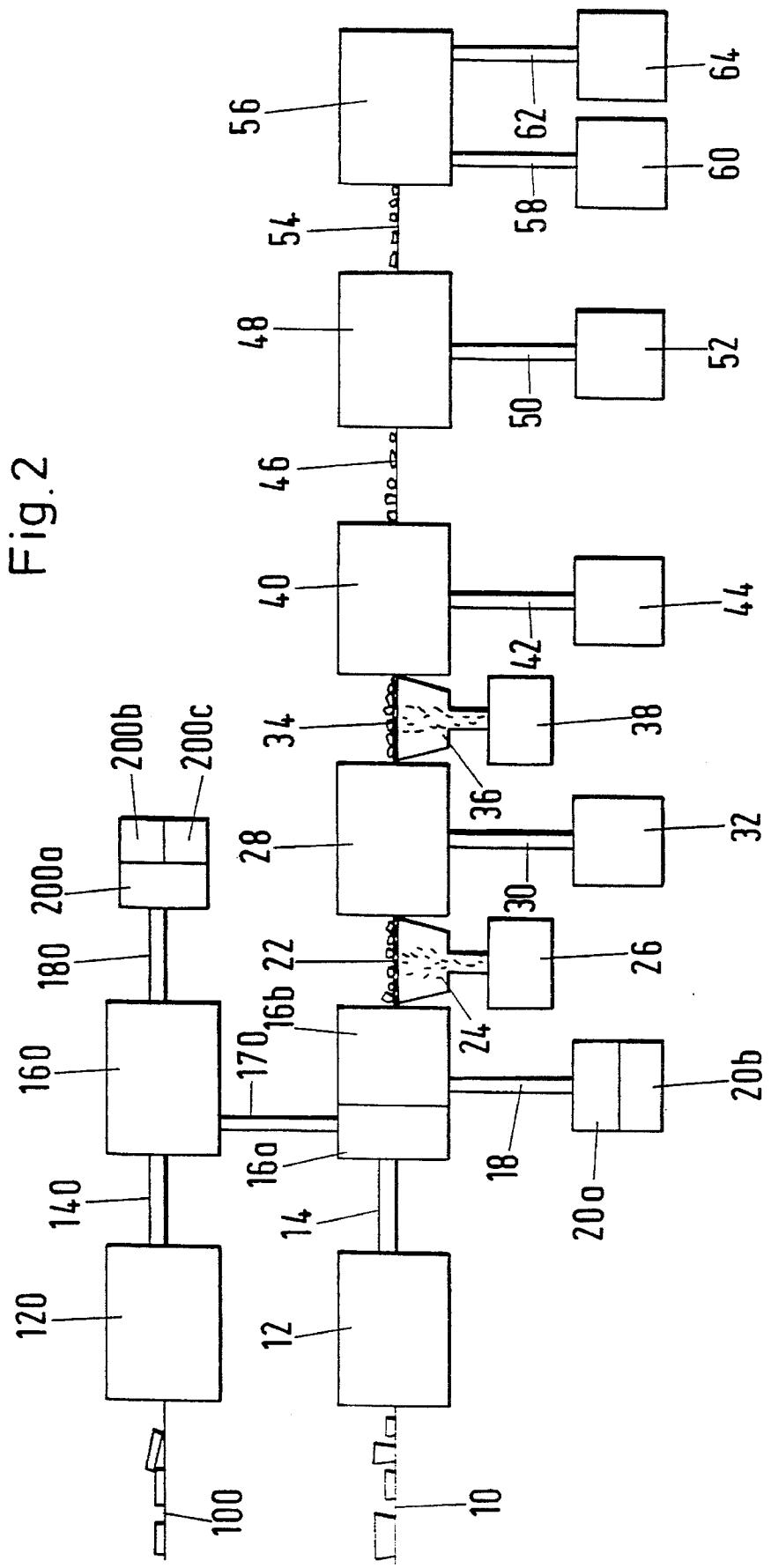
FIG. 2 a schematic illustration of a separating system of the invention wherein both picture tubes as well as gas discharge tubes can be disassociated into recyclable constituents.

The separating system for picture tubes shown in FIG. 1 can be expanded to a separating system for picture tubes and gas discharge tubes shown in FIG. 2 by adding a conveyor belt 100, a shredder 120, a conveyor belt 140, a thermal section 160, a conduit 170, a conduit 180, a mercury condenser 200a and two collecting vessels 200b and 200c.

By analogy to the method already set forth with reference to FIG. 1, the system shown in FIG. 2 enables a disassociation of gas discharge tubes into recyclable constituents.

The following work steps are thereby additionally implemented:

Gas discharge tubes of all types as employed in mercury vapor lamps, fluorescent lamps or the like, are conducted to the shredder 120 via the conveyor belt 100 that is caused to vibrate for the purpose of making the flow of material uniform, the gas discharge tubes being comminuted in said shredder 120 into palm-sized fragments. From the shredder 120, the gas discharge tube fragments are conducted via the conveyor belt 140, which proceeds in a closed connecting pipe so that no pollutants can emerge into the atmosphere, to the pollutant separating means comprising the thermal section 160. Pumping is thereby simultaneously carried out at the connecting pipe carrying the conveyor belt 140 in order to conduct the gases escaping when the gas discharge tubes are opened from the shredder 120 to the pollutant separating means which contains the thermal section 160.

In the next step, the fragments of the gas discharge tubes are heated along the thermal section 160 such that the mercury potentially contained in the fragments is evaporated. The mercury vapor and/or further gases that serve the purpose of plasma formation in the gas discharge tubes are then pumped off through the conduit 180 to the mercury condenser 200a. A separation of the mercury from the remaining gases—which are supplied to the collecting vessel 200c—occurs therein on the basis of cold traps, and this separated mercury is then supplied to the collecting vessel 200b.

The gas discharge tube fragments thus freed of mercury and/or other gases previously serving the purpose of gas discharge are supplied via the conduit 170 to the intermediate storage 16a in the next step and, thus, to the separating system already set forth with reference to FIG. 1.

The further disassociation steps for the remaining gas discharge tube fragments essentially correspond to those work steps set forth in the case of disassociating picture tubes:

Pollutant-containing coats of the gas discharge tubes are thus separated in the drum 16b, and the separator 28 serves the purpose of separating magnetic metals, whereas sub-fractional parts are screened out between the drum 16b and the separator 28. All of the glass of the gas discharge tubes is then separated in the front glass separator 40 in order to be supplied to the collecting vessel 44. The front glass of the picture tubes, namely, is recyclable in common with the glass of the gas discharge tubes. A further screening of sub-fractional parts again occurs between the separators 28 and 40.

As described with reference to FIG. 1, the separator 48 subsequently sees to a separation of all non-magnetic metals.

Since gas discharge tubes comprise no constituents corresponding to the front glass of picture tubes, all fragments reaching the opaque material separator 56 are supplied via the conduit 58 to the collecting vessel 60 without any materials whatsoever landing in the collecting vessel 64 via the conduit 62 in the case of the disassociation of gas discharge tubes.

Picture tubes can be simultaneously supplied to the system shown in FIG. 2 via the conveyor belt 10, and gas discharge tubes supplied via the conveyor belt 100 can be disassociated into recyclable constituents in accord with the method of the invention. The intermediate storage 16a thereby sees to a constant flow of material into the separating system.

The collecting vessels 20b, 26, 32, 38, 44, 52, 60, 64, 200b and 200c in the system illustrated in FIG. 2 are also emptied at regular intervals and the corresponding constituents are supplied to recycling systems.

The output of the system shown in FIG. 2 analogously corresponds to that of the separating system shown in FIG. 1. It should also be additionally mentioned that the thermal section 160 essentially enables a complete separation of mercury.

Both individually as well as in arbitrary combination, the features of the invention disclosed in the above specification, in the drawing as well as in the claims can be critical for the realization of the various embodiments of the invention.

I claim:

1. A method for disintegrating closed glass members, which have metal and glass portions, contain pollutants and include picture tubes and gas discharge tubes, into recyclable constituents, and separating the constituents from pollutants and into glass constituents according to glass types, which include front glass and cone glass of picture tubes and glass of gas discharge tubes, and into other constituents, which include metal constituents and opaque materials including ceramic, pottery, stone and porcelain parts, the method comprising the steps of comminuting the closed glass members into pieces of a palm size, which were rubbed together during comminuting without essentially any loss of surface characteristics of the pieces; separating any freed pollutants from the pieces and removing the pollutants from the pieces in a pollutant separator means to form a mixture of broken glass piece and piece of other constituents; separating very small parts from the mixture; separating any magnetic metal pieces from the mixture with first means for separating; then separating pieces of front glass of picture tubes and pieces of glass of discharge tubes from the mixture with a second means for separating; then separating non-magnetic metal pieces from the remaining pieces of the mixture with third means for separating; and then separating any remaining glass pieces from any opaque materials, with fourth means for separating; at least one of the first, second, third and fourth means using at least one transmission and reception means for infrared light for utilizing absorptivity, transmissivity and reflectivity of different pollutant-freed glass piece for selecting the piece during the separating step.

2. A method according to claim 1, wherein the step of separating and removing the pollutants include rubbing the pieces together in a separating chamber of the pollutant separating means with the detached pollutant coating being passed through a pipe to a first filter system with a following first storage container and includes pumping out gases released during the comminuting of the glass bodies to a second storage container.

3. A method according to claim 2, wherein the step of removing the pollutants includes applying an auxiliary substance to facilitate removing the pollutants from the pieces, placing the pieces and auxiliary substance in a first centrifuge to cause separation based on different specific gravities of the pieces and pollutants, applying a vacuum to the pollutant separating chamber to remove the detached pollutants and secondary auxiliary substance to the first filter system, filtering the auxiliary substance freed of pollutants in said first filter system to form a purified auxiliary substance and returning the purified auxiliary substance to the separating chamber, whereas the pollutants are left in the first storage chamber.

4. A method according to claim 3, wherein the step of providing an auxiliary substance provides a substance which is inert with respect to the pollutant coatings, said substance being selected from a group of non-fluid solid substances and inert fluids, said non-fluid solids including staple fiber and sand, said inert fluids including water and inert gases.

5. A method according to claim 3, wherein the pollutant separating chamber has at least one first nozzle, said nozzle spraying the auxiliary substance onto the pieces and forming eddies in the auxiliary substance for assisting in the separating step.

6. A method according to claim 3, wherein subsequent to freeing the pieces of the pollutant coatings by contacting with the auxiliary substance, said pieces being conveyed out of separating chamber, said auxiliary substance carrying the detached pollutant coatings due to different specific gravities compared with the remaining pieces being separated therefrom in a second centrifuge and the auxiliary substance together with the detached pollutant coatings being conveyed by a vacuum to said first filter system.

7. A method according to claim 1, wherein the glass members include mercury containing glass bodies, said step of comminuting being accomplished in a cooled atmosphere to essentially eliminate the release of any mercury vapors, said step of separating including heating the pieces to create a mercury vapor, pumping-out the mercury vapor, condensing the mercury vapor in means for condensing and conveying the condensed mercury vapor to a third storage chamber.

8. A method according to claim 1, wherein the step of separating pollutants includes providing a mercury separating chamber in which mercury is rendered harmless with the aid of a mercury binding additive operating by solidification, complexing and absorption, transferring the mercury combined with the additive to a second filtering system, freeing the mercury in the second filter system from the additive and conveying the freed mercury to a third storage chamber while returning the additive free of mercury to the mercury separating chamber.

9. A method according to claim 8, which includes contacting the additive with the pieces by selectively spraying the additive thereon and passing the pieces through the additive, said additive together with the mercury bound thereto being separated from the pieces by means of a third centrifuge due to specific gravity.

10. A method according to claim 1, wherein the step of separating the magnetic metal pieces incorporates a magnet in the first means for separating.

11. A method according to claim 1, wherein the step of separating the magnetic metal and the step of separating the non-magnetic metal utilizes different electrical static charging of the pieces during each of the separating steps.

12. A method according to claim 1, wherein the step of separating the magnetic metal and the step of separating the non-magnetic metal incorporate at least one metal sensor used during each of the steps of separating.

13. A method according to claim 1, wherein the step of separating the opaque materials includes at least one ceramic sensor.

14. A method according to claim 1, wherein between the steps of separating, includes transferring the materials between each of the separating means utilizing conveyor belts and vibrating said conveyor belts during transfer of the pieces.

15. A method according to claim 1, wherein the step of removing the very small parts from the mixture subsequent to the step of separating and removal of the pollutants includes passing the mixture over a screen for screening the very small parts from the mixture and transferring the small parts to a storage chamber.

16. A method according to claim 15, wherein the step of screening includes transferring the mixture and small parts to the first means for separating with a conveyor having a screen-like surface, vibrating said conveyor to cause the small parts to pass therethrough.

17. A method according to claim 1, wherein the step of comminuting the glass members includes a first crushing means for picture tubes, and a second crushing means for gas discharge tubes.

18. A method according to claim 1, wherein the step of comminuting includes crushing the glass members containing mercury in a first crushing means to form a first group of pieces, crushing the glass members free of mercury in a second crushing means to form a second group of crushed pieces, the step of separating the pollutants includes separating the mercury from the first group, then adding the first group to the second group to separate the remaining pollutants therefrom.

* * * * *